United States Patent

[11] 3,547,164

| [72] | Inventor | Carl Bloom |
| | | Springfield, Mass. |
| [21] | Appl. No. | 785,304 |
| [22] | Filed | Dec. 9, 1968 |
| [45] | Patented | Dec. 15, 1970 |
| [73] | Assignee | Worthington Corporation |
| | | Harrison, N.J. |
| | | a corporation of Delaware |

[54] COMPACT HOUSING FOR ROTARY COMPRESSOR SYSTEM
5 Claims, 5 Drawing Figs.

[52] U.S. Cl. .................................................. 141/326, 222/401, 418/104
[51] Int. Cl. ................................................... F04f 1/02, B65d 83/00, B65b 3/04
[50] Field of Search .......................................... 141/326, 322; 222/400.8, 401, 402; 230/152, 31, 235; 103/234, 235; 4/6, 6(AC)

[56] References Cited
UNITED STATES PATENTS

| 1,842,682 | 1/1932 | Lynch | 222/401X |
| 2,274,118 | 2/1942 | Altmayer | 141/326X |
| 2,706,586 | 4/1955 | Sikorski | 222/400.8 |
| 3,091,372 | 5/1963 | Tidd | 222/401 |
| 3,162,130 | 12/1964 | Glisson | 103/6(AC)UX |
| 3,265,009 | 8/1966 | Weis | 103/235 |
| 3,385,513 | 5/1968 | Kilgore | 230/152 |

Primary Examiner—Mark Newman
Assistant Examiner—Warren J. Krauss
Attorney—Daniel H. Bobis ABSTRACT: A rotary compressor assembly constructed to prevent leakage from the compressor housing to atmosphere through the interface between the cylindrical section and the covers of the housing.

The compressor is disposed substantially within the tank which receives the compressor discharge and is connected to the wall of the tank. A seal between the compressor and the tank wall seals the tank and thereby prevents leakage from the compressor to atmosphere.

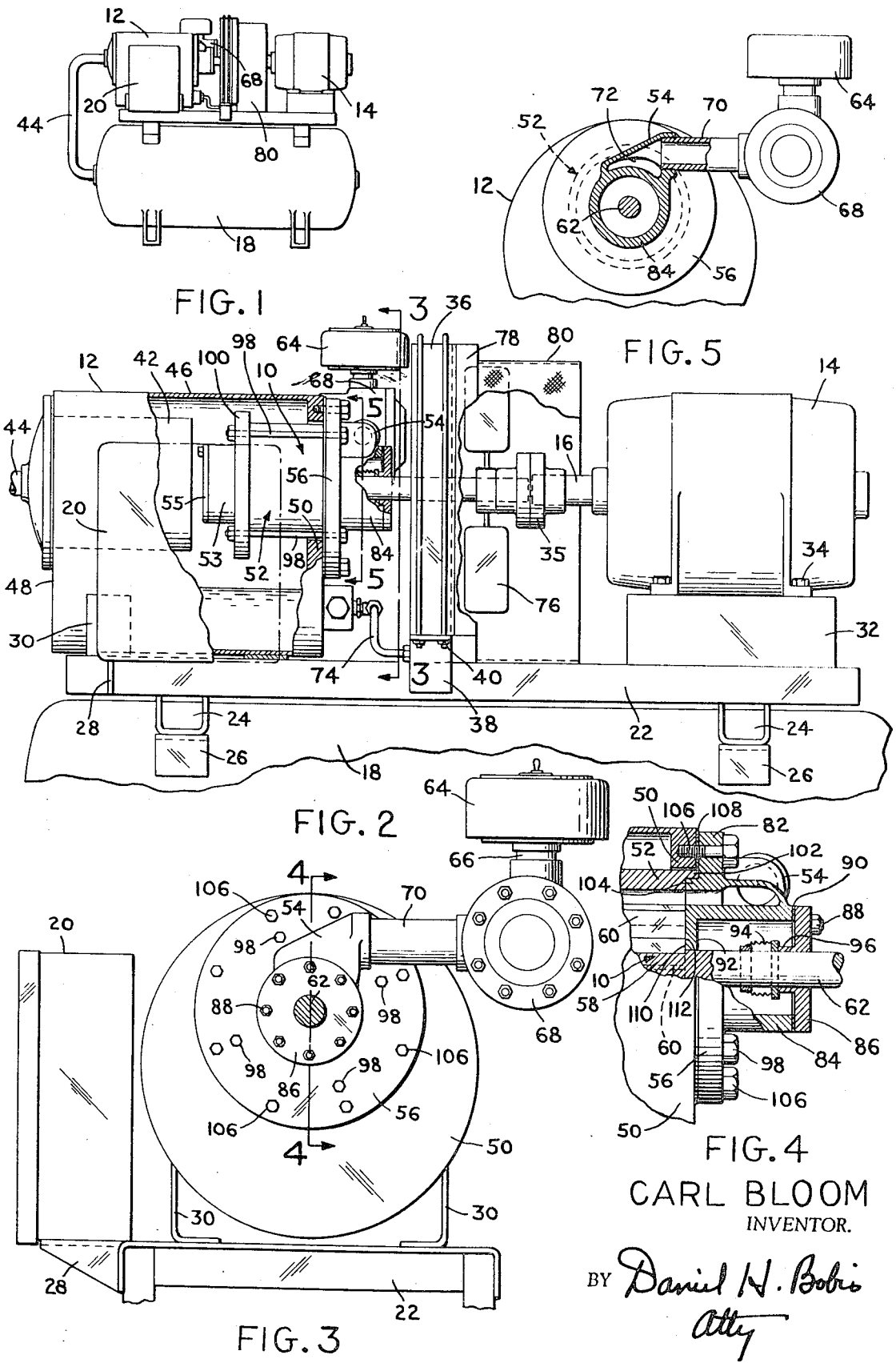

3,547,164

COMPACT HOUSING FOR ROTARY COMPRESSOR SYSTEM

BACKGROUND OF THE INVENTION

1. Field of the Invention

This invention relates to compressors and particularly to devices adapted to prevent leakage of the air or gas being compressed by submerging or surrounding the compressor mechanism or some portion thereof in a fluid.

2. Description of the Prior Art

In the construction of sliding vane rotary type compressors, the clearance between the end of the rotor and the end covers of the compressor housing is critical to the functioning of the device. If this clearance is too large, gas compressed in the pocket formed by cylinder wall of the compressor housing, the rotor, adjacent sliding vanes and the end covers of the compressor housing will leak from one pocket to the adjacent pocket of lower pressure, substantially reducing the efficiency and output of the compressor. If the tolerance between the end of the rotor and the end covers of the housing is too small, there will be an interference of the parts which can result in damage to the machinery as well as reduced performance. In view of these facts, it is not unusual to find that maching tolerances measured in the ten thousandths of an inch (0.0001) are required in order to properly position the end covers to the cylindrical section of the compressor housing.

Because the tolerances are so important, it is not possible to use any gasket type sealing means between the end covers of the compressor housing and the cylindrical section of the housing to prevent leakage from the compressor to the atmosphere. The interposing of any between the end covers and the cylindrical section would place a component of variable dimension in the chain of elements whose overall dimension must be held to within the above mentioned ten thousandths of an inch.

Therefore, to provide sealing between the front cover of the compressor and the compressor housing, the prior art had to use an O-ring type seal disposed between the circumferential surface of the front cover and the inner wall of the cylindrical section of the compressor housing. This type of construction is shown in FIG. 2 of U.S. PAT. No. 3,385,513 issued May 28, 1968 to C.R. Kilgore where an O-ring 20 is disposed between the outer wall 11 of the housing and the front cover 13a.

The problems with this type of sealing arrangement are the relative inefficient seal provided by an O-ring seal assembly as compared to a gasket sealing assembly, and the rapid deterioration of the O-ring sealing member as compared to a gasket sealing member for this type of application. The latter factor results from hardening, cracking and permanent deformation of the O-ring due to the heat, air and oil to which the O-ring is exposed in a typical compressor application. Additionally, it is often necessary to remove the covers of the compressor for periodic servicing of the vanes and bearings within the compressor, and therefore the covers must be slid out of engagement from the cylindrical section of the housing thereby rubbing and scuffing the O-ring seal along the inner wall of the housing.

To overcome the problems of the prior art the applicant has provided a new, improved construction for a rotary compressor in which leakage from the compressor to atmosphere through the interface between the cylindrical section of the compressor housing and the covers of the compressor housing is prevented by a gasket type sealing means without in any way effecting the relative position of the front cover to the compressor rotor.

A new construction accomplishes this end by placing the compressor housing substantially in the tank which receives the compressor discharge and seals the front cover of the compressor with a gasket-type seal to the wall of the receiver tank. By this construction, the interfaces between the cylindrical section of the compressor housing and the covers of the housing are located in an enclosed area sealed from the atmosphere. A gasket-type seal can be used to seal the front cover of the compressor to the tank, without effecting the performance of the compressor in any way, to prevent leakage from the tank to atmosphere. If any leakage does occur it would be "inward" leakage from the discharge tank back into the compressor housing. This inward leakage is much less serious then a comparable conventional leakage from the compressor housing to atmosphere since the inward leakage does not have as great an effect as conventional leakage on compressor efficiency and output.

Accordingly, it is an object of the present invention to provide a compressor assembly in which no special intervening sealing medium is required between the covers of the compressor housing and the cylindrical section of the compressor housing to effectively seal the interfaces between these elements from the atmosphere.

Another object of the present invention is to provide a compressor assembly in which the compressor is substantially located within the tank which receives the compressor discharge.

Yet, another object of the present invention is to provide a compressor assembly in which the sealing means to prevent leakage from the compressor housing to the atmosphere can be effected by gasket type sealing means without adversely effecting performance or efficiency of the compressor.

Still another object of the present invention is to provide a compressor system in which the clearance between the compressor rotor and the front cover of the compressor is not affected by the means used to seal leakage from the compressor to the atmosphere through the interface between the covers and the cylindrical section of the compressor housing.

A further object of the present invention is to provide a compressor assembly which does not require a separate line from the outlet of the compressor to the tank which receives the compressor discharge.

Yet, a further object of the present invention is to provide a compressor assembly having a compact envelope in which the tank which receives the discharge of the compressor also acts as an oil sump for the lubrication system of the compressor.

Still a further object of the present invention is to provide a compressor assembly in which the tank which receives the discharge of the compressor contains means to separate oil from the discharge of the compressor and acts as a sump for the lubrication system of the compressor.

BRIEF DESCRIPTION OF THE DRAWINGS

FIG. 1 is a front view of a compressor assembly built in accordance with the teachings of this invention.

FIG. 2 is an enlarged view of FIG. 1 partially in section.

FIG. 3 is a view taken along lines 3–3 of FIG. 2.

FIG. 4 is an enlarged fragmentary view of a portion of FIG. 2.

FIG. 5 is a view taken along lines 5–5 of FIG. 2. DESCRIPTION OF THE PREFERRED EMBODIMENTS As shown in FIGS. 1 through 5, a compressor generally indicated at 10 is mounted in a tank generally indicated at 12 which receives the discharge from the compressor and is driven by an electric motor 14 through a shaft assembly 16, all of which are mounted on top of a compressed gas storage tank 18 and are controlled from control panel 20. The compressor-tank combination is positioned with relation to electric motor 14 by fastening all of the units to a mounting frame 22 which in turn is fixed to tank 18 by means of legs 24 on the mounting frame which are welded or connected by any other convenient method to arms 26 protruding from the compressed air storage tank. Control panel 20 is connected to mounting frame 22 by bracket 28, while tank 12 by means of legs 30 is connected to mounting frame 22 by welding or any other means of attachment such as bolting or vibration mounts, etc. Motor 14 is fastened to pedestal 32 by means of bolts 34 to coaxially position the motor 14 and the compressor 10. A flexible coupling 35 in shaft assembly 16 compensates for any slight misalignment between the compressor and motor. A radiator 36 whose function will be explained later is connected to mounting frame 22 by means of brackets 38 which are bolted to the base of the radiator by bolts 40 and are connected to the mounting frame by welding or any other convenient methods of attachment.

Mounted substantially within compressor discharge tank 12 are the compressor 10 and air oil separator 42 which separates out the oil mixed in the discharge of the compressor from the compressed gas before the compressed gas passes from the receiving tank 12 through line 44 to the compressed gas storage tank 18. The oil separated by the air oil separator 42 drops to the sump portion at the bottom of tank 12. Tank 12 consists of three sections, a cylindrical portion 46, an end plate 48 in which demister 42 is mounted, and a front wall 50 in which the compressor 10 is mounted as will be further explained below.

As seen from FIGS. 2 through 5 the compressor 10 has a cylindrical section of the compressor housing generally indicated at 52, a rear cover 53 including an end plate 55, and an inlet housing 54 on the front cover 56 of the compressor. The compressor is of the rotary vane type having a compressor rotor 58 with sliding vanes 60 mounted therein and it is driven by the end 62 of shaft assembly 16 which delivers power from motor 14. Air to be compressed enters the inlet assembly through air cleaner 64 which is connected by fitting 66 to the suction control assembly 68 which throttles the inlet gas flow to the compressor in response to the pressure in storage tank 18 to unload compressor 10 during periods of nonoperation. The suction control assembly 68 is connected to inlet housing 54 by inlet pipe 70. The fluid to be compressed after reaching the inlet housing 54 passes through the suction inlet opening 72 in front cover 56 to enter the cylinder of the compressor. Compression occurs in the cylinder in the normal manner found in a rotary compressor, namely by varying the volume of the pocket formed between the adjacent vanes extending from the compressor rotor and the inner wall of the cylindrical section of the housing of the compressor. The pocket varies in size during the rotary cycle of the rotor, diminishing as compression occurs until the compressed air is exhausted from the compressor housing at a point not shown in the drawings.

Oil which has been separated from the compressor discharge by baffle means in the tank (not shown) and air oil separator 42 falls to the sump portion of tank 12 and because of the high pressure in the tank is forced through conduit 74 to radiator 36 where the oil is cooled and then returns to the inlet of the compressor. Fan 76 driven by shaft assembly 16 pushes air through radiator 36 to produce the necessary cooling. A shroud 78 on the radiator increases the efficiency of the fan, and a shield 80 is mounted around the fan for purposes of safety.

Sealing of Interface between Compressor Housing and Atmosphere

As shown from FIGS. 2, 3 and 4, the front cover 56 of compressor 10 consists of a sealing flange 82, a shaft seal housing 84 and a shaft seal housing cover 86 connected to shaft seal housing 84 by bolts 88 or any other convenient fastening means. A gasket 90 maintains an air tight seal between the shaft seal housing and the shaft seal housing cover. The shaft 62 passes through the shaft seal housing cover and rear wall 92 of the shaft sealing housing to drive the compressor rotor 58. A mechanical seal 94 attached to shaft 62 coacts with collar 96 on the shaft seal housing cover to maintain an airtight seal between the interior of the shaft seal housing and the atmosphere. As seen in FIG. 2, front cover 56 of compressor 10 is connected by through bolts 98 to the flange 100 protruding from the rear cover 53 of the compressor housing thereby holding cylindrical section 52 of the compressor housing in operative position between the ends of the compressor.

The front cover 56 of the compressor housing is aligned in the cylindrical section 52 of the compressor housing by means of a step 104 on the front cover of the compressor which is concentrically fitted within lip 102 on the end surface of the compressor housing 52.

The abutting surfaces on lip 102 of compressor housing 52 and on step 104 of front cover 56 are carefully machined to provide a seal between the housing and the cover. A similar arrangement not shown in the drawings is used to align and seal the rear cover 53 to the cylindrical portion of the housing.

The compressor 10 is mounted to the tank by means of sealing flange 82 of front cover 56 which is connected to front wall 50 of tank 12 by means of bolts 106. A seal is effected between the inner space of tank 12, which receives the compressor discharge and the ambient atmosphere by a gasket seal 108 which is disposed above the opening in wall 50 of the tank.

Since no sealing medium need be interposed between either end 53 or 56 and the cylindrical section 52 of the compressor housing, the distance between the inner wall 110 of front cover 56 and the inner wall of rear cover 53 (not shown in the drawings) can be accurately set and maintained for the life of the compressor. Therefore, the position of the compressor rotor 58 relative to the inner surface 110 of the front cover 56 and the corresponding surface of the rear cover 53 is also uneffected. This is a significant advantage because the clearance between the ends of the compressor rotor and the vanes therein and the inner surfaces of the front and the rear covers is of prime importance for effective operation of a compressor, as previously explained.

It should be noted that sealing the front cover of the compressor to the front wall of the tank prevents any leakage from the interfaces of the compressor housing to the ambient atmosphere but instead exposes the compressor housing interfaces to the pressure within the tank. Any "inward" leakage which does occur from the tank into the compressor housing will be much less serious for the effective performance of the compressor than would a comparable amount of leakage from the compressor housing to the atmosphere.

It should also be noted that placing the compressor substantially within the tank which receives the compressor discharge has other advantages as for example, drastically reducing the overall size of the compressor assembly package. Additionally, by locating the compressor within the discharge package it is significantly easier to soundproof or suppress the noise produced by the rotary compressor.

It should be further noted that the invention set forth above is not limited to sliding vane type rotary compressors. The invention is equally applicable to rotary screw type compressors.

It will be understood that various changes in the details, materials, and arrangements or parts which have been herein described and illustrated in order to explain the nature of the invention may be made by those skilled in the art within the principle and scope of the invention, as expressed in the appended claims.

I claim:
1. A rotary compressor assembly comprising:
tank means for receiving compressed fluid, said tank means having one wall defining an opening and inner and outer wall surfaces, said tank means also having a discharge outlet for compressed fluid;
fluid compressing means including a housing disposed to extend into said opening in said tank means and a rotor mounted within said housing;
a drive means for said compressing means, drive means including a drive shaft connected to said rotor;
said compressing means having an inlet disposed at a point external to said tank means and an outlet within said tank means to permit compressed fluid to be discharged therein;
said compressing means housing having cover means at the opposite ends thereof, one cover means being connected to the inwardly disposed end of the housing and the other cover means being connected to the opposite end of the housing and the one wall of the tank at the periphery of the opening, said other cover means coacting with said housing and said rotor to provide an operative seal between the outward end of said rotor and said other cover means;

sealing means located between one of said wall surfaces and the confronting surface of said other cover means adjacent the opening in the one wall of said tank means;

means providing a mechanical seal for said drive shaft at a point outboard of said other cover means; and means to connect said other cover means at one end of said housing to said tank means about said opening for mounting said compressing means in operative relation to said tank and to permit said cover means and said sealing means to form a fluid tight cover for said opening in said tank means, and thereby prevent leakage from said compressing means housing to atmosphere.

2. The combination claimed in claim 1 wherein said sealing means is connected to the outer wall surface of the one wall on said tank means.

3. The combination claimed in claim 1 wherein:
said other cover means includes a sealing flange; and
said sealing means comprises gasket means disposed between said sealing flange of said other cover means and the one wall of said tank.

4. The combination claimed in claim 3 wherein said sealing flange of said other cover means is disposed outside the one wall of said tank means.

5. The combination claimed in claim 4 wherein the inlet of said compressor housing is disposed in said other cover means connected to said tank means about said opening.

UNITED STATES PATENT OFFICE
CERTIFICATE OF CORRECTION

Patent No. 3,547,164            Dated December 15, 1970

Inventor(s) Carl Bloom

It is certified that error appears in the above-identified patent and that said Letters Patent are hereby corrected as shown below:

IN THE SPECIFICATION:
Column 1, line 32, after "any" insert --gasket--

IN THE CLAIMS:
Claim 1 (column 4, line 63) before "drive" (second occurrence) insert --said--

SIGNED AND SEALED

MAR 9 1971

(SEAL)
Attest:

Edward M. Fletcher, Jr.
Attesting Officer

WILLIAM E. SCHUYLER, JR.
Commissioner of Patents